United States Patent
Sun et al.

(10) Patent No.: US 11,513,508 B2
(45) Date of Patent: Nov. 29, 2022

(54) METHOD, COMPONENT, AND ELECTRONIC DEVICE FOR CREATING HUMAN MACHINE INTERFACE

(71) Applicant: Siemens Aktiengesellschaft, Munich (DE)

(72) Inventors: Qi Sun, Beijing (CN); Shun Jie Fan, Beijing (CN); Ming Jie, Beijing (CN); Xian Tao Meng, Langfang (CN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/337,112

(22) PCT Filed: Sep. 29, 2016

(86) PCT No.: PCT/CN2016/100868
§ 371 (c)(1),
(2) Date: Mar. 27, 2019

(87) PCT Pub. No.: WO2018/058451
PCT Pub. Date: Apr. 5, 2018

(65) Prior Publication Data
US 2019/0250596 A1 Aug. 15, 2019

(51) Int. Cl.
*G06F 3/048* (2013.01)
*G05B 23/02* (2006.01)
(Continued)

(52) U.S. Cl.
CPC ..... *G05B 23/0216* (2013.01); *G05B 19/0425* (2013.01); *G05B 19/418* (2013.01);
(Continued)

(58) Field of Classification Search
CPC .................................. G05B 23/0216
See application file for complete search history.

(56) References Cited

U.S. PATENT DOCUMENTS 7,925,611 B1 * 4/2011 Bromley ............ G05B 19/409
706/45
8,713,456 B2 * 4/2014 Hernandez ............ G06F 9/451
715/762
(Continued)

FOREIGN PATENT DOCUMENTS

| CN | 101110029 A | 1/2008 |
| CN | 103870270 A | 6/2014 |

(Continued)

OTHER PUBLICATIONS

Notification of Transmittal of the International Search Report and the Written Opinion of the International Searching Authority (Form PCT/ISA/220) for International PCT Application No. PCT/CN2016/100868 which has an International Filing Date of Sep. 29, 2016.
(Continued)

*Primary Examiner* — Hua Lu
(74) *Attorney, Agent, or Firm* — Harness, Dickey & Pierce, P.L.C.

(57) ABSTRACT

A method, a component, and an electronic device relating to the field of industrial automation technology, particularly relating to the creation of a human machine interface, and are used for automatically creating an HMI of a system. The method for creating an HMI comprises: a first component of a system receives, via an HMI, a first command for creating an HMI for the system; the first component obtains, from each searched and found second component of the system an HMI resource of each of the second components; and the first component creates, on the basis of an HMI resource of the first component and the obtained HMI resource from each of the second components, the HMI for the system. One component of the system collects the HMI resource of another component of the system and creates the HMI for
(Continued)

the whole system, providing a method for automatically creating the HMI for the system.

11 Claims, 12 Drawing Sheets

(51) Int. Cl.
    *G06F 3/04817*     (2022.01)
    *G05B 19/042*     (2006.01)
    *G05B 19/418*     (2006.01)

(52) U.S. Cl.
    CPC ..... *G05B 23/0272* (2013.01); *G06F 3/04817* (2013.01); *Y02P 90/02* (2015.11)

(56) References Cited

U.S. PATENT DOCUMENTS

| | | | |
|---|---|---|---|
| 8,935,607 B2* | 1/2015 | Zhu | G06F 16/9577 715/269 |
| 11,144,183 B2* | 10/2021 | Anand | G06F 9/451 |
| 2009/0097505 A1* | 4/2009 | Takahashi | H04L 12/40065 370/503 |
| 2011/0046754 A1* | 2/2011 | Bromley | G05B 19/41885 700/83 |
| 2011/0093800 A1 | 4/2011 | Gottwald et al. | |
| 2012/0131437 A1* | 5/2012 | Zhu | G06F 40/109 715/234 |
| 2014/0055495 A1* | 2/2014 | Kim | G09G 5/32 345/660 |
| 2014/0173558 A1 | 6/2014 | Martinez Canedo et al. | |
| 2014/0173637 A1 | 6/2014 | Becker et al. | |
| 2014/0203999 A1* | 7/2014 | Shim | G06F 3/04817 345/2.2 |
| 2015/0186119 A1* | 7/2015 | Chouinard | G05B 19/0425 717/113 |
| 2015/0277404 A1* | 10/2015 | Maturana | G05B 15/02 700/83 |
| 2016/0055619 A1* | 2/2016 | Lin | G06T 3/0056 345/591 |
| 2016/0349931 A1* | 12/2016 | Walter | G09G 5/30 |
| 2018/0052835 A1* | 2/2018 | Billi-Duran | G06F 16/487 |

FOREIGN PATENT DOCUMENTS

| | | | |
|---|---|---|---|
| CN | 103870324 A | | 6/2014 |
| CN | 104750062 A | | 7/2015 |
| CN | 105629903 A | | 6/2016 |
| CN | 105629903 B | * | 2/2019 |
| EP | 1873634 A2 | | 1/2008 |
| EP | 2743867 A1 | | 6/2014 |
| EP | 2746883 A1 | | 6/2014 |
| EP | 2889709 A2 | | 7/2015 |

OTHER PUBLICATIONS

International Search Report (Form PCT/ISA/210) for International PCT Application No. PCT/CN2016/100868 which has an International Filing Date of Sep. 29, 2016.

Written Opinion of the International Searching Authority (Form PCT/ISA/237) for International PCT Application No. PCT/CN2016/100868 which has an International Filing Date of Sep. 29, 2016.

* cited by examiner

METHOD, COMPONENT, AND ELECTRONIC DEVICE FOR CREATING HUMAN MACHINE INTERFACE

PRIORITY STATEMENT

This application is the national phase under 35 U.S.C. § 371 of PCT International Application No. PCT/CN2016/100868 which has an International filing date of Sep. 29, 2016, which designated the United States of America, the entire contents of which are hereby incorporated herein by reference.

FIELD

Embodiments of the present application generally relate to the technical field of industrial automation, in particular to a method, component and electronic device for generating a human-machine interface.

BACKGROUND ART

A system generally comprises multiple components. Taking a production line in a factory as an example of a system, there may be devices such as an electric machine, a mechanical arm, a conveyor belt and a sensor on a production line, and these devices may be used to execute a manufacturing process as components of the system, i.e. the production line.

In order to realize convenient, real-time monitoring of a component in a system, one possible solution is to integrate a web server in a component, with a human-machine interface (HMI) being stored on the web server; by inputting an address of the web server in a browser running on an electronic device, e.g. a mobile phone or tablet, an HMI of a corresponding component can be displayed. The electronic device can receive, via the HMI, a control operation applied to the component by an operator. Here, the component in which the web server is integrated and which provides the HMI is called a "smart component".

One operator can monitor one smart component via one HMI, but cannot monitor the entire system.

SUMMARY

Embodiments of the present application provides a method, component and electronic device for generating an HMI, which are capable of automatically generating an HMI of a system; a user can monitor the entire system via the HMI of the system.

In a first embodiment, a method for generating a human-machine interface (HMI) is provided; the method may be performed by a first component in a system, the system further comprising at least one second component. Using the method, an HMI of a system can be generated automatically. In the method, the first component receives a first instruction via an HMI of the first component, the first instruction being used to indicate that an HMI of the system should be generated; the first component seeks each of the at least one second component in the; the first component acquires an HMI resource of each second component found; the first component generates the HMI of the system on the basis of an HMI resource of the first component and the acquired HMI resource of each second component.

In a second embodiment, a method for generating a human-machine interface (HMI) is provided; the method may be performed by a second component in a system, the system comprising a first component and at least one second component. In the method, one of the at least one second component receives a second instruction from the first component, the second instruction being used to acquire an HMI resource of the second component; the second component transmits the HMI resource of the second component to the first component in response to the second instruction, the HMI resource of the second component being used for generation of the HMI of the system by the first component.

In a third embodiment, a method for human-machine interaction is provided; the method may be performed by an electronic device. In the method, an electronic device displays, on a screen of the electronic device, an HMI of a first component; receives a first operation inputted by a user on the HMI of the first component displayed on the screen, the first operation being used to indicate that an HMI of a system in which the first component is located should be displayed; generates a first instruction, the first instruction being used to indicate that the HMI of the system should be generated; transmits the first instruction to the first component; receives the HMI of the system from the first component; and displays the HMI of the system on the screen.

In a fourth embodiment, a system for generating a human-machine interface (HMI) is provided, the system comprising: an electronic device and, included on a system, a first component and at least one second component;

the electronic device is used to display an HMI of the first component on a screen of the electronic device; receive a first operation inputted by a user on the HMI of the first component, the first operation being used to indicate that an HMI of the system in which the first component is located should be displayed; generate a first instruction, the first instruction being used to indicate that the HMI of the system should be generated; and transmit the first instruction to the first component;

the first component is used to receive the first instruction from the electronic device via the HMI of the first component; seek each of the at least one second component in the system; transmit a second instruction to each second component found, the second instruction being used to acquire an HMI resource of the second component;

each second component found by the first component is used to transmit the HMI resource of the second component to the first component in response to the second instruction;

the first component is further used to acquire the HMI resource of the second component; generate the HMI of the system on the basis of an HMI resource of the first component and the acquired HMI resource of each second component; and transmit the generated HMI of the system to the electronic device; and the electronic device is further used to receive the HMI of the system from the first component, and display the received HMI of the system on the screen.

In a fifth embodiment, a first component is provided, the first component being a component in a system, the system further comprising at least one second component, and the first component comprising:

an instruction receiving module, for receiving a first instruction via an HMI of the first component, the first instruction being used to indicate that an HMI of the system should be generated;

a component seeking module, for seeking each of the at least one second component in the system;

an HMI resource acquisition module, for acquiring an HMI resource of each second component found by the component seeking module; and a system HMI generating module, for generating the HMI of the system on the basis of an HMI resource of the first component and the HMI resource of each second component acquired by the HMI resource acquisition module.

In a sixth embodiment, a second component is provided, the second component being a component in a system, the system comprising at least one the second component, and the system further comprising a first component; the second component comprises:

an instruction receiving module, for receiving a second instruction from the first component, the second instruction being used to acquire an HMI resource of the second component; and an HMI resource transmission module, for transmitting the HMI resource of the second component to the first component in response to the second instruction, the HMI resource of the second component being used for generation of an HMI of the system by the first component.

In a seventh embodiment, an electronic device is provided, comprising:

an HMI display module, for displaying an HMI of a first component on a screen of the electronic device;

an input operation receiving module, for receiving a first operation inputted by a user on the HMI of the first component displayed on the screen, the first operation being used to indicate that an HMI of a system in which the first component is located should be displayed;

an instruction generating and transmitting module, for generating a first instruction and transmitting the first instruction to the first component, the first instruction being used to indicate that the HMI of the system should be generated;

an HMI receiving module, for receiving the HMI of the system from the first component; and the HMI display module being further used to display the HMI of the system on the screen.

In an eighth embodiment, a first component is provided, the first component being a component in a system, the system further comprising at least one second component, and the first component comprising:

at least one communication module, for receiving a first instruction via an HMI of the first component, the first instruction being used to indicate that an HMI of the system should be generated; and at least one processor, for: seeking each of the at least one second component via the at least one communication module; acquiring, via the at least one communication module, an HMI resource of each second component found; generating the HMI of the system on the basis of an HMI resource of the first component and the acquired HMI resource of each second component.

In a ninth embodiment, a second component is provided, the second component being a component in a system, the system comprising at least one the second component, and the system further comprising a first component; the second component comprises: at least one communication module, for receiving a second instruction from the first component, the second instruction being used to acquire an HMI resource of the second component; at least one processor, for transmitting the HMI resource of the second component to the first component via the at least one communication module in response to the second instruction, the HMI resource of the second component being used for generation of an HMI of the system by the first component.

In a tenth embodiment, an electronic device is provided, comprising: at least one screen, for displaying an HMI of a first component; at least one user interface, for receiving a first operation inputted by a user on the HMI of the first component, the first operation being used to indicate that an HMI of a system in which the first component is located should be displayed; at least one processor, for generating a first instruction, the first instruction being used to indicate that the HMI of the system should be generated; at least one communication module, for transmitting the first instruction to the first component, and receiving the HMI of the system from the first component; the at least one screen being further used to display the HMI of the system.

In an eleventh embodiment, a machine-readable medium is provided; a machine instruction is stored on the machine-readable medium, and the machine instruction, when executed by a processor, causes the processor to execute the method provided in any optional embodiment in the first, second or third embodiment, or in the first, second and third embodiments.

Figure 1:
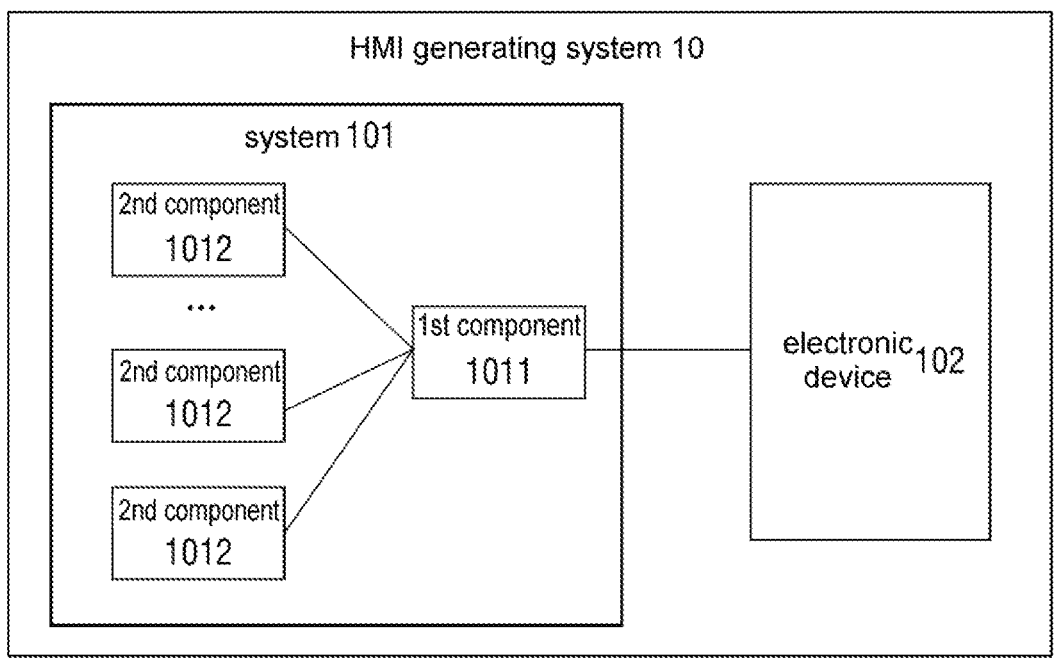
FIGS. 1, 2A and 2B are structural schematic diagrams of HMI generating systems provided in embodiments of the present invention.

List of labels used in the drawings:
10: HMI generating system
101: system
1011: first component
1012: second component
S301: display HMI of first component 1011
S302: first operation
S303: generate first instruction
S304: first instruction
S305: seek all second components 1012 on system 101
S306: second instruction
S307: HMI resource S308: generate HMI of system 101
S309: HMI of system 101
S310: display HMI of system 101
S1001: user clicks "generate" button on HMI of a component
S1002: the component, as first component 1011, seeks other component in LAN
S1003: the component acquires its own screen resolution
S1004: screen resolution low?
S1005: the component acquires index HMI resource from other component
S1006: screen resolution medium?
S1007: the component acquires abbreviation HMI resource from other component
S1008: the component acquires general HMI resource from other component
S1009: the component generates HMI of system 101
1011a: instruction receiving module
1011b: component seeking module
1011c: HMI resource acquisition module
1011d: system HMI acquisition module
1011e: screen resolution acquisition module
1011f: web server
1012a: instruction receiving module
1012b: HMI resource transmission module
102a: HMI display module
102b: input operation receiving module
102c: instruction generating and transmitting module
102d: HMI receiving module
1011g: communication module
1011h: processor
1012c: communication module
1012d: processor
102e: screen
102f: user interface
102g: processor
102h: communication module

DETAILED DESCRIPTION OF EXAMPLE EMBODIMENTS

In a first embodiment, a method for generating a human-machine interface (HMI) is provided; the method may be performed by a first component in a system, the system further comprising at least one second component. Using the method, an HMI of a system can be generated automatically. In the method, the first component receives a first instruction via an HMI of the first component, the first instruction being used to indicate that an HMI of the system should be generated; the first component seeks each of the at least one second component in the; the first component acquires an HMI resource of each second component found; the first component generates the HMI of the system on the basis of an HMI resource of the first component and the acquired HMI resource of each second component.

The component whose HMI is currently displayed serves as the first component, receives the user's operation for generating the HMI of the entire system, and generates the HMI of the entire system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

Optionally, prior to the first component acquiring an HMI resource of each second component found, the method further comprises: the first component acquiring a screen resolution of an electronic device displaying the first component; the step of the first component acquiring an HMI resource of each second component found comprises: the first component acquiring an HMI resource, matched to the screen resolution, of each second component found.

Acquiring different HMI resources for different screen resolutions enables the HMI of the system to be displayed more clearly.

Optionally, the first component acquires an index HMI resource of the second component if the screen resolution is lower than a preset first screen resolution threshold, wherein an index HMI resource of a component comprises an icon of the component and/or a name of the component; the first component acquires an abbreviation HMI resource of the second component if the screen resolution is not lower than the first screen resolution threshold and not higher than a preset second screen resolution threshold, wherein an abbreviation HMI resource of a component comprises an icon of the component and/or a name of the component, and further comprises preset key parameter information of the component; the first component acquires a general HMI resource of the second component if the screen resolution is higher than the preset second screen resolution threshold, wherein a general HMI resource of a component comprises an icon of the component and/or a name of the component, and further comprises preset detailed parameter information of the component.

Optionally, a web server is integrated in the first component, with the HMI of the first component and the generated HMI of the system being stored on the web server.

The implementation of this optional embodiment is web-based. The first component, as a web server, provides the HMI of the entire system as a webpage to the electronic device in which a browser is integrated. There is no need for dedicated software or hardware equipment; the generation of the HMI of the system is more efficient, convenient and quick, and the complexity of implementation of the entire scheme is reduced. Moreover, web-based implementation enables the embodiments of the present invention to be suitable for all electronic devices capable of using web applications, such as mobile phones and tablets, so the scope of application is broader.

In a second embodiment, a method for generating a human-machine interface (HMI) is provided; the method may be performed by a second component in a system, the system comprising a first component and at least one second component. In the method, one of the at least one second component receives a second instruction from the first component, the second instruction being used to acquire an HMI resource of the second component; the second component transmits the HMI resource of the second component to the first component in response to the second instruction, the HMI resource of the second component being used for generation of the HMI of the system by the first component.

The first component of the system acquires the HMI resource of another component in the system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

Optionally, the HMI resource of the second component is one of the following HMI resources: an index HMI resource of the second component, the index HMI resource comprising an icon of the second component and/or a name of the component, and being configured to be transmitted to the first component when a screen resolution of an electronic device displaying the first component is lower than a preset first screen resolution threshold; an abbreviation HMI resource of the second component, the abbreviation HMI resource comprising an icon of the second component and/or a name of the component, and further comprising preset key parameter information of the second component, and being configured to be transmitted to the first component when the screen resolution of the electronic device displaying the first component is not lower than the first screen resolution threshold and not higher than a preset second screen resolution threshold; a general HMI resource of the second component, the general HMI resource comprising an icon of the second component and/or a name of the component, and further comprising preset detailed parameter information of the second component, and being configured to be transmitted to the first component when the screen resolution of the electronic device displaying the first component is higher than the preset second screen resolution threshold.

Acquiring different HMI resources for different screen resolutions enables the HMI of the system to be displayed more clearly.

In a third embodiment, a method for human-machine interaction is provided; the method may be performed by an electronic device. In the method, an electronic device displays, on a screen of the electronic device, an HMI of a first component; receives a first operation inputted by a user on the HMI of the first component displayed on the screen, the first operation being used to indicate that an HMI of a system in which the first component is located should be displayed; generates a first instruction, the first instruction being used to indicate that the HMI of the system should be generated; transmits the first instruction to the first component; receives the HMI of the system from the first component; and displays the HMI of the system on the screen.

The component whose HMI is currently displayed serves as the first component; the electronic device receives, via the HMI of the first component, the user's operation for generating the HMI of the entire system, and generates the HMI of the entire system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

Optionally, a web server is integrated in the first component, with the HMI of the first component and the generated HMI of the system being stored on the web server.

The implementation of this optional embodiment is web-based. The first component, as a web server, provides the HMI of the entire system as a webpage to the electronic device in which a browser is integrated. There is no need for dedicated software or hardware equipment; the generation of the HMI of the system is more efficient, convenient and quick, and the complexity of implementation of the entire scheme is reduced. Moreover, web-based implementation enables the embodiments of the present invention to be suitable for all electronic devices capable of using web applications, such as mobile phones and tablets, so the scope of application is broader.

In a fourth embodiment, a system for generating a human-machine interface (HMI) is provided, the system comprising: an electronic device and, included on a system, a first component and at least one second component;

the electronic device is used to display an HMI of the first component on a screen of the electronic device; receive a first operation inputted by a user on the HMI of the first component, the first operation being used to indicate that an HMI of the system in which the first component is located should be displayed; generate a first instruction, the first instruction being used to indicate that the HMI of the system should be generated; and transmit the first instruction to the first component;

the first component is used to receive the first instruction from the electronic device via the HMI of the first component; seek each of the at least one second component in the system; transmit a second instruction to each second component found, the second instruction being used to acquire an HMI resource of the second component;

each second component found by the first component is used to transmit the HMI resource of the second component to the first component in response to the second instruction;

the first component is further used to acquire the HMI resource of the second component; generate the HMI of the system on the basis of an HMI resource of the first component and the acquired HMI resource of each second component; and transmit the generated HMI of the system to the electronic device; and the electronic device is further used to receive the HMI of the system from the first component, and display the received HMI of the system on the screen.

The component whose HMI is currently displayed serves as the first component; the electronic device receives, via the HMI of the first component, the user's operation for generating the HMI of the entire system, and generates the HMI of the entire system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

In a fifth embodiment, a first component is provided, the first component being a component in a system, the system further comprising at least one second component, and the first component comprising:

an instruction receiving module, for receiving a first instruction via an HMI of the first component, the first instruction being used to indicate that an HMI of the system should be generated;

a component seeking module, for seeking each of the at least one second component in the system;

an HMI resource acquisition module, for acquiring an HMI resource of each second component found by the component seeking module; and a system HMI generating module, for generating the HMI of the system on the basis of an HMI resource of the first component and the HMI resource of each second component acquired by the HMI resource acquisition module.

The component whose HMI is currently displayed serves as the first component, receives the user's instruction for generating the HMI of the entire system, and generates the HMI of the entire system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

Optionally, the first component further comprises a screen resolution acquisition unit module, for acquiring a screen resolution of an electronic device displaying the first component, before the HMI resource of each second component found by the component seeking module is acquired; the HMI resource acquisition module is specifically used for acquiring an HMI resource, matched to the screen resolution, of each second component found by the component seeking module.

Acquiring different HMI resources for different screen resolutions enables the HMI of the system to be displayed more clearly.

Optionally, the screen resolution acquisition unit module is specifically used for:

acquiring an index HMI resource of the second component if the screen resolution is lower than a preset first screen resolution threshold, wherein an index HMI resource of a component comprises an icon of the component and/or a name of the component;

acquiring an abbreviation HMI resource of the second component if the screen resolution is not lower than the first screen resolution threshold and not higher than a preset second screen resolution threshold, wherein an abbreviation HMI resource of a component comprises an icon of the component and/or a name of the component, and further comprises preset key parameter information of the component; and acquiring a general HMI resource of the second component if the screen resolution is higher than the preset second screen resolution threshold, wherein a general HMI resource of a component comprises an icon of the component and/or a name of the component, and further comprises preset detailed parameter information of the component.

Optionally, the first component further comprises a web server, with the HMI of the first component and the generated HMI of the system being stored on the web server.

The implementation of this optional embodiment is web-based. The first component, as a web server, provides the HMI of the entire system as a webpage to the electronic device in which a browser is integrated. There is no need for dedicated software or hardware equipment; the generation of the HMI of the system is more efficient, convenient and quick, and the complexity of implementation of the entire scheme is reduced. Moreover, web-based implementation enables the embodiments of the present invention to be suitable for all electronic devices capable of using web applications, such as mobile phones and tablets, so the scope of application is broader.

In a sixth embodiment, a second component is provided, the second component being a component in a system, the system comprising at least one the second component, and the system further comprising a first component; the second component comprises:

an instruction receiving module, for receiving a second instruction from the first component, the second instruction being used to acquire an HMI resource of the second component; and an HMI resource transmission module, for transmitting the HMI resource of the second component to the first component in response to the second instruction, the HMI resource of the second component being used for generation of an HMI of the system by the first component.

The first component of the system acquires the HMI resource of another component in the system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

Optionally, the HMI resource of the second component is one of the following HMI resources: an index HMI resource of the second component, the index HMI resource comprising an icon of the second component and/or a name of the component, and being configured to be transmitted to the first component by the HMI resource transmission module when a screen resolution of an electronic device displaying the first component is lower than a preset first screen resolution threshold; an abbreviation HMI resource of the second component, the abbreviation HMI resource comprising an icon of the second component and/or a name of the component, and further comprising preset key parameter information of the second component, and being configured to be transmitted to the first component by the HMI resource transmission module when the screen resolution of the electronic device displaying the first component is not lower than the first screen resolution threshold and not higher than a preset second screen resolution threshold; a general HMI resource of the second component, the general HMI resource comprising an icon of the second component and/or a name of the component, and further comprising preset detailed parameter information of the second component, and being configured to be transmitted to the first component by the HMI resource transmission module when the screen resolution of the electronic device displaying the first component is higher than the preset second screen resolution threshold.

Acquiring different HMI resources for different screen resolutions enables the HMI of the system to be displayed more clearly.

In a seventh embodiment, an electronic device is provided, comprising:

an HMI display module, for displaying an HMI of a first component on a screen of the electronic device;

an input operation receiving module, for receiving a first operation inputted by a user on the HMI of the first component displayed on the screen, the first operation being used to indicate that an HMI of a system in which the first component is located should be displayed;

an instruction generating and transmitting module, for generating a first instruction and transmitting the first instruction to the first component, the first instruction being used to indicate that the HMI of the system should be generated;

an HMI receiving module, for receiving the HMI of the system from the first component; and the HMI display module being further used to display the HMI of the system on the screen.

The component whose HMI is currently displayed serves as the first component; the electronic device receives, via the HMI of the first component, the user's operation for generating the HMI of the entire system, and generates the HMI of the entire system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

Optionally, a web server is integrated in the first component, with the HMI of the first component and the generated HMI of the system being stored on the web server.

The implementation of this optional embodiment is web-based. The first component, as a web server, provides the HMI of the entire system as a webpage to the electronic device in which a browser is integrated. There is no need for dedicated software or hardware equipment; the generation of the HMI of the system is more efficient, convenient and quick, and the complexity of implementation of the entire scheme is reduced. Moreover, web-based implementation enables the embodiments of the present invention to be suitable for all electronic devices capable of using web applications, such as mobile phones and tablets, so the scope of application is broader.

In an eighth embodiment, a first component is provided, the first component being a component in a system, the system further comprising at least one second component, and the first component comprising:

at least one communication module, for receiving a first instruction via an HMI of the first component, the first instruction being used to indicate that an HMI of the system should be generated; and at least one processor, for: seeking each of the at least one second component via the at least one communication module; acquiring, via the at least one communication module, an HMI resource of each second component found; generating the HMI of the system on the basis of an HMI resource of the first component and the acquired HMI resource of each second component.

The component whose HMI is currently displayed serves as the first component, receives the user's operation for generating the HMI of the entire system, and generates the HMI of the entire system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

In a ninth embodiment, a second component is provided, the second component being a component in a system, the system comprising at least one the second component, and the system further comprising a first component; the second component comprises: at least one communication module, for receiving a second instruction from the first component, the second instruction being used to acquire an HMI resource of the second component; at least one processor, for transmitting the HMI resource of the second component to the first component via the at least one communication module in response to the second instruction, the HMI resource of the second component being used for generation of an HMI of the system by the first component.

The first component of the system acquires the HMI resource of another component in the system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

In a tenth embodiment, an electronic device is provided, comprising: at least one screen, for displaying an HMI of a first component; at least one user interface, for receiving a first operation inputted by a user on the HMI of the first component, the first operation being used to indicate that an HMI of a system in which the first component is located should be displayed; at least one processor, for generating a first instruction, the first instruction being used to indicate that the HMI of the system should be generated; at least one communication module, for transmitting the first instruction to the first component, and receiving the HMI of the system from the first component; the at least one screen being further used to display the HMI of the system.

The component whose HMI is currently displayed serves as the first component; the electronic device receives, via the HMI of the first component, the user's operation for generating the HMI of the entire system, and generates the HMI of the entire system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

In an eleventh embodiment, a machine-readable medium is provided; a machine instruction is stored on the machine-readable medium, and the machine instruction, when executed by a processor, causes the processor to execute the method provided in any optional embodiment in the first, second or third embodiment, or in the first, second and third embodiments.

Provided in embodiments of the present invention are a method, component and electronic device for generating an HMI, which are used for automatically generating an HMI of a system; based on the generated HMI of the system, an operator can monitor the entire system.

In an embodiment of the present invention, an HMI of a component in a system is displayed on a screen of an electronic device; in order to make it easy to distinguish the component from other components, the component is called a "first component". A user inputs an operation on the HMI of the first component displayed on the screen of the electronic device; in order to make it easy to distinguish the operation from other operations, the operation is called a "first operation". By way of the first operation, the user indicates that an HMI of the system should be displayed.

The electronic device transmits to the first component a first instruction indicating that the HMI of the system should be generated; after receiving the first instruction, the first component acquires an HMI resource of another component included in the system; here, the other component is called a "second component". The first component generates the HMI of the system on the basis of the HMI resource of each second component, and transmits the generated HMI of the system to the electronic device.

The electronic device displays the HMI of the system on the screen.

By way of a component on a system collecting an HMI resource of another component and generating an HMI of the entire system, a scheme for automatically generating an HMI of a system is provided.

The component whose HMI is currently displayed serves as the first component, receives the user's operation for generating the HMI of the entire system, and generates the HMI of the entire system, enabling the HMI of the entire system to be generated conveniently and quickly, with a simple and convenient user operation. There is no need for an independent system integrator to generate the HMI of the entire system, avoiding the introduction of new equipment, and reducing the complexity of implementation of the scheme; the generation of the HMI of the system is more efficient, convenient and quick.

Furthermore, web-based implementation of the embodiments of the present invention is possible. The first component, as a web server, provides the HMI of the entire system as a webpage to the electronic device in which a browser is integrated. There is no need for dedicated software or hardware equipment; the generation of the HMI of the system is more efficient, convenient and quick, and the complexity of implementation of the entire scheme is reduced. Moreover, web-based implementation enables the embodiments of the present invention to be suitable for all electronic devices capable of using web applications, such as mobile phones and tablets, so the scope of application is broader.

Embodiments of the present invention are explained in detail below with reference to the accompanying drawings.

FIG. 1 shows an HMI generating system 10 provided in an embodiment of the present invention. As shown in FIG. 1, the HMI generating system 10 comprises: an electronic device 102 and, included on a system 101, a first component 101 and at least one second component 1012. The first component 1011 is a smart component mentioned previously. An HMI is integrated inside the second component 1012. The electronic device 102 may be a device having a screen and capable of performing human-machine interaction, such as a mobile phone, notebook computer, tablet, desktop computer or server.

The system 101 may be a production line; the components in the system 101 may be devices on the production line mentioned previously, e.g. sensors, electric machines, conveyor belts and mechanical arms, etc. The system 101 could also be an entire factory, and a component in the system 101 may be a production line in the factory. An operating situation of each production line can be obtained via the HMI of the system 101. The system 101 could also be all metro lines in a city; a component in the system 101 is then one metro line in the city, and an operating situation of each metro line can be obtained via the HMI of the system 101.

The electronic device 102 and the first component 1011 may be in communication with each other; a connection with the first component 1011 may be a wireless connection or a wired connection. In the case of a wireless connection, communication between the first component 1011 and the electronic device 102 may employ mobile communication technology, e.g. communication based on the Long Term Evolution (LTE) protocol, or the first component 1011 and the electronic device 102 could be connected to each other via Wireless Fidelity (WiFi), or communication between the first component 1011 and the electronic device 102 could employ near-field communication technology. In the case of a wired connection, the connection between the first component 1011 and the electronic device 102 may be a Universal Serial Bus (USB) connection, a twisted pair connection, etc.

The first component 1011 and the second component 1012 may also be in communication with each other; a connection with the second component 1012 may also be a wireless connection or a wired connection. For an optional embodiment of the connection, reference may be made to the connection between the electronic device 102 and the first component 1011.

Optionally, any one second component 1012 and the electronic device 102 may also be in communication with each other. For the manner of connection, reference may also be made to the previously mentioned connection between the first component 1011 and the electronic device 102. Optionally, any one second component 1012 on the system 101 is a smart component, and any one smart component on the system 101 may serve as the first component 1011; when the user performs an operation on the HMI of the component displayed on the screen of the electronic device 102, to indicate that the HMI of the system 101 should be displayed, the component receives from the electronic device 102 an instruction to generate the HMI of the system 101, and generates the HMI of the system 101.

Figure 2A:
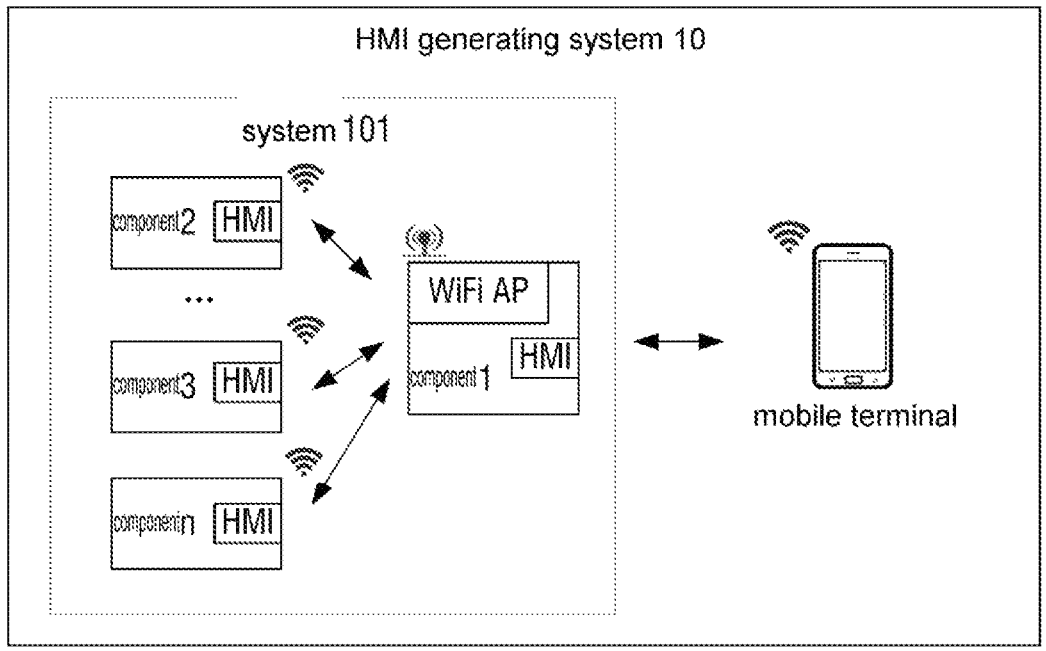
Figure 2B:
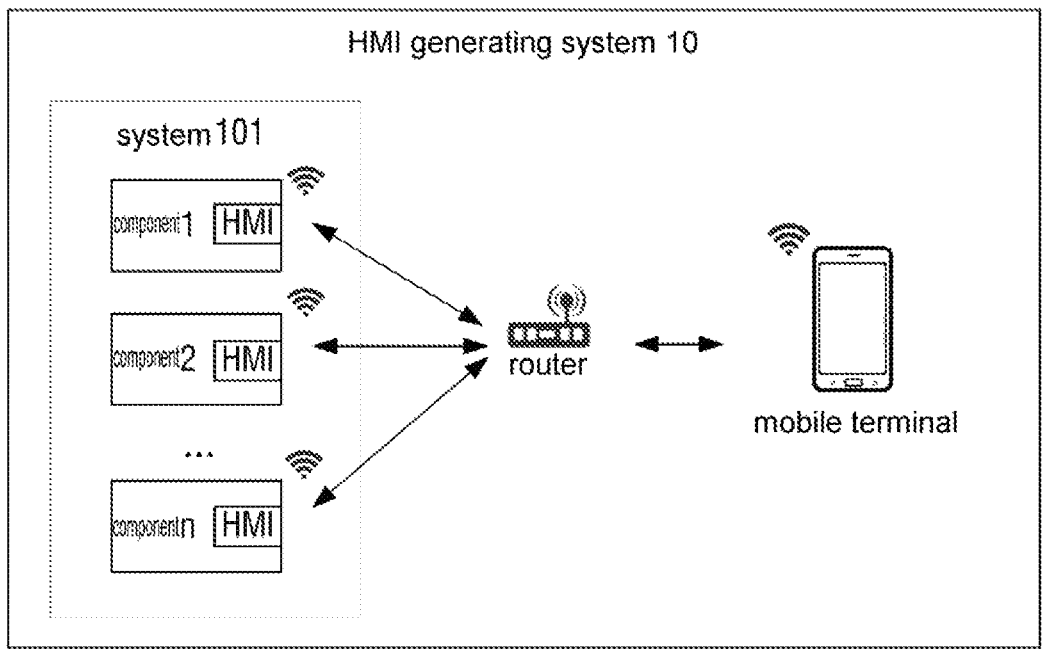

FIGS. 2A and 2B show two optional embodiments of the HMI generating system 10.

In FIG. 2A, a component 1 serves as the first component 1011, being equivalent to a WiFi access point (AP), and being connected by WiFi to a mobile terminal serving as the electronic device 102 and to components 2 to n serving as the at least one second component 1012, wherein n is an integer not less than 2.

In FIG. 2B, similarly, a component 1 serves as the first component, and components 2 to n serve as the at least one second component. The component 1, the components 2 to n, and the electronic device 102 are all connected to a WiFi router, and perform communication via the WiFi router.

In FIGS. 2A and 2B, the electronic device 102 is a mobile terminal. An HMI is integrated in each of components 1 to n. In FIG. 2B, the router may serve as a part of the system 101, or be independent of the system 101.

Figure 3:
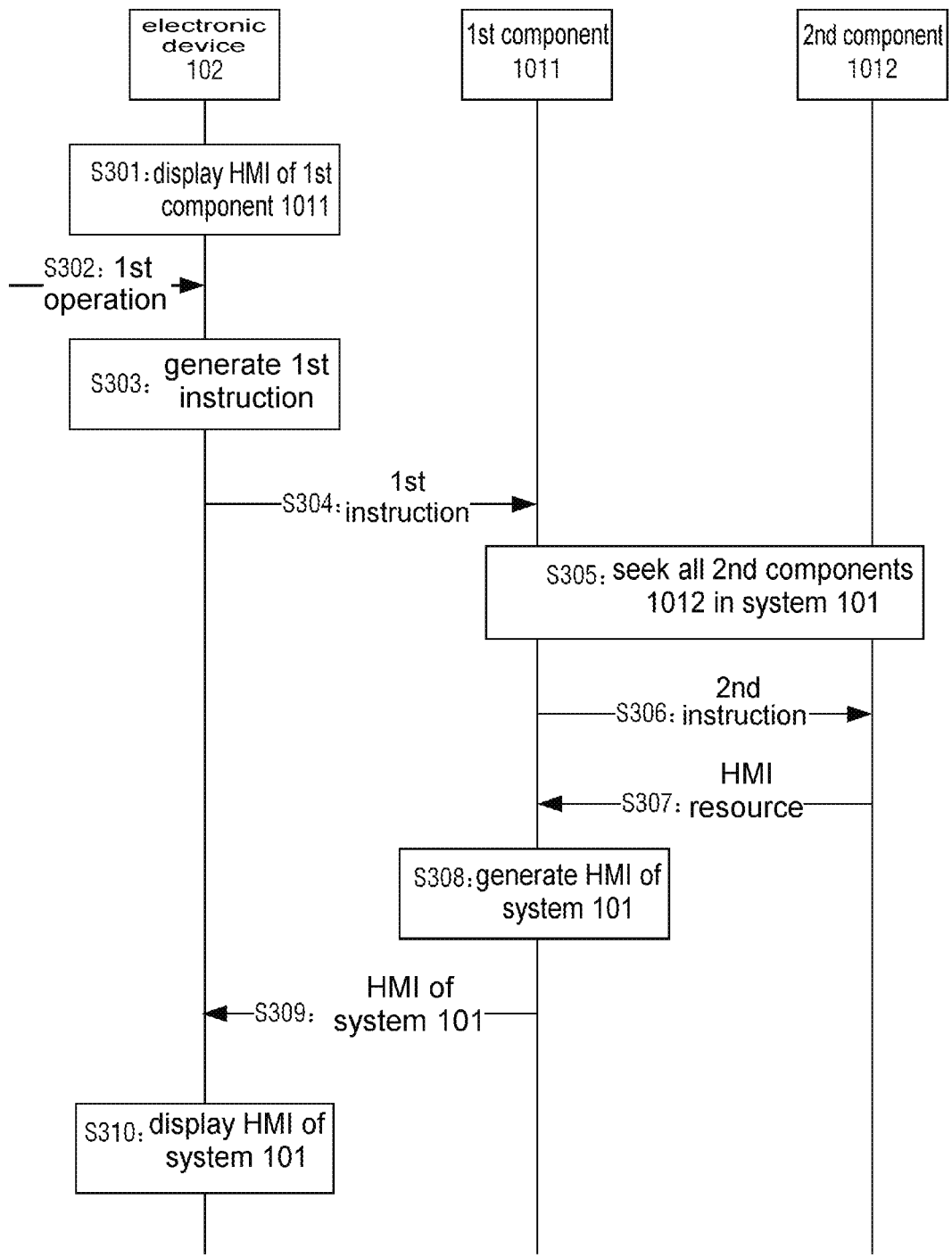
FIG. 3 is a flow chart of an HMI generating method provided in an embodiment of the present invention.

FIG. 3 shows a flow chart of an HMI generating method provided in an embodiment of the present invention. In order to provide a simple illustration, FIG. 3 merely shows one second component 1012; in fact, the first component 1011 must seek all components other than itself on the system 101. As shown in FIG. 3, the flow comprises the following steps:

S301: the electronic device 102 displays, on its own screen, the HMI of the first component 1011.

S302: the electronic device receives a first operation inputted on the HMI of the first component 101 by the user.

Optionally, the screen of the electronic device 102 is a touch screen, capable of sensing a touch operation inputted on the screen by the user. It could also be an operation inputted on the HMI of the first component 1011 via a mouse or keyboard etc. connected to the electronic device 102. The first operation is used to indicate that the HMI of the system 101 in which the first component 101 is located should be displayed.

S303: the electronic device 102 generates a first instruction.

The first instruction is used to indicate that the HMI of the system 101 should be generated.

S304: the electronic device 102 transmits the first instruction to the first component 101.

S305: after receiving the first instruction, the first component 1011 seeks all second components 1012 in the system 101.

S306: the first component 1011 transmits a second instruction to the second component 1012 found; the second instruction is used to acquire an HMI resource of the second component 1012.

S307: after receiving the second instruction, the second component 1012 transmits its own HMI resource to the first component 1011.

S308: the first component 1011 generates the HMI of the system 101.

S309: the first component 1011 sends the generated HMI of the system 101 to the electronic device 102.

S310: the electronic device 102 displays, on its own screen, the HMI of the system 101.

Optionally, as shown in FIGS. 2A and 2B, a local area network is formed among the first component 1011 and the second components 1012. The first component 1011 may seek the second component 1012 according to an internet protocol (IP) address, or the first component 1011 may seek the second component 1012 according to a name of the second component 1012, or the first component 1011 seeks the second component 1012 according to the name of the second component 1012 and the IP address.

Figure 4:
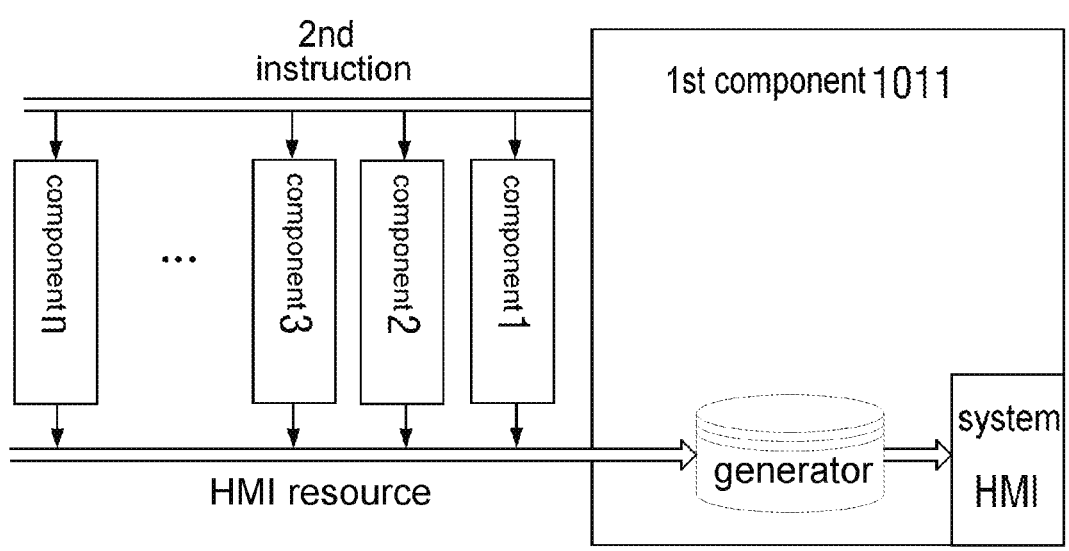
FIG. 4 shows a diagram of interaction among different components when an HMI of a system is being generated in an embodiment of the present invention.

FIG. 4 shows a schematic diagram of interaction between the first component 1011 and the second components 1012, and the generation of the HMI of the system 101 by the first component 1011.

The first component 1011 transmits the second instruction to all the second components 1012 on the system 101. Amongst components 1 to n, the component on whose HMI the user inputs the first operation serves as the first component 1011 to transmit the second instruction; after receiving the second instruction, all the second components 1012 return the HMI resources to the first component 1011. The first component 1011 generates the HMI of the system 101 on the basis of the received HMI resources of all the second components 1012, for display on a display screen of the electronic device 102.

Figure 5:
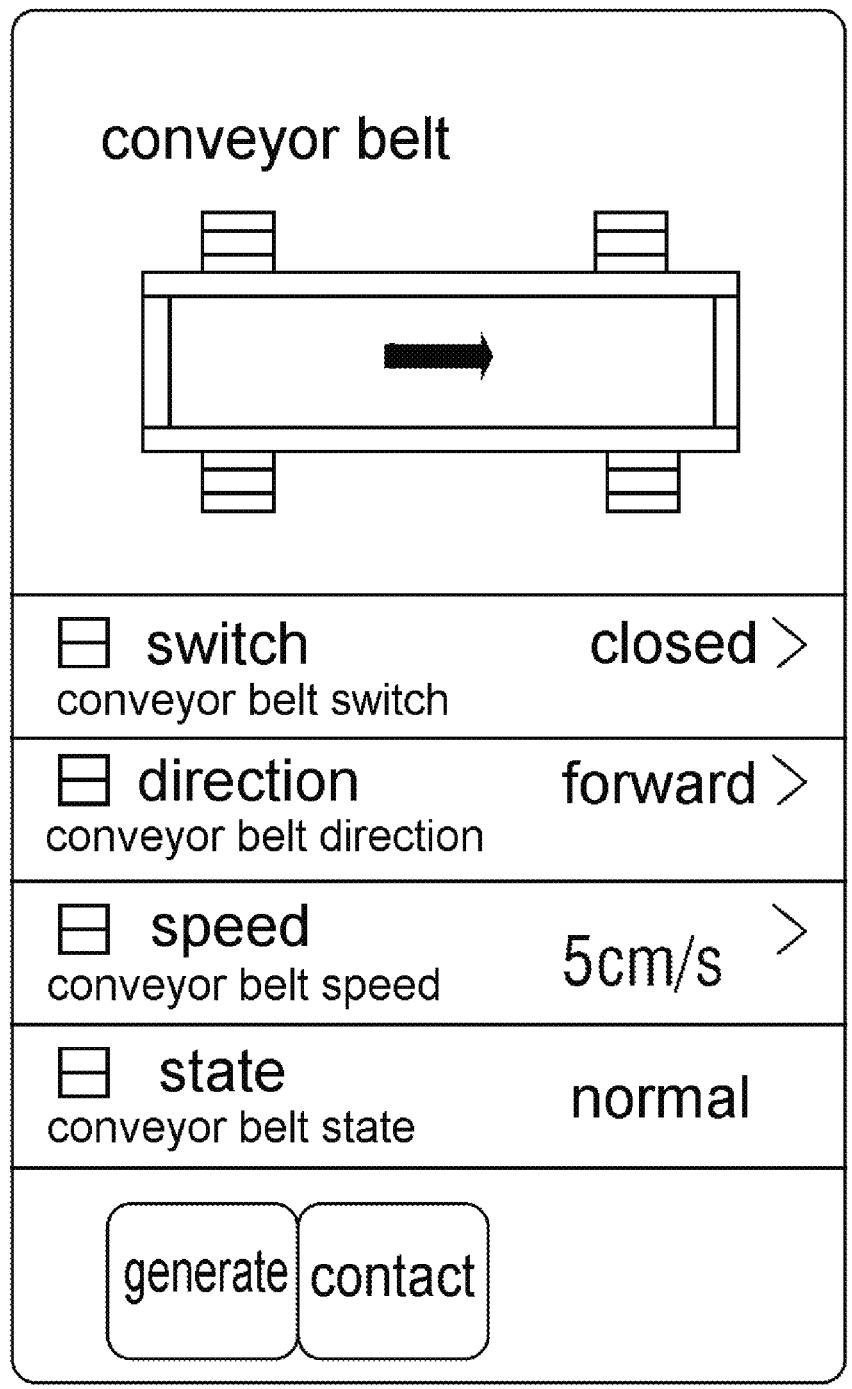
FIGS. 5, 6 and 7 show examples of HMIs of a conveyor belt component, a sensor component and a mechanical arm component respectively.
Figure 6:
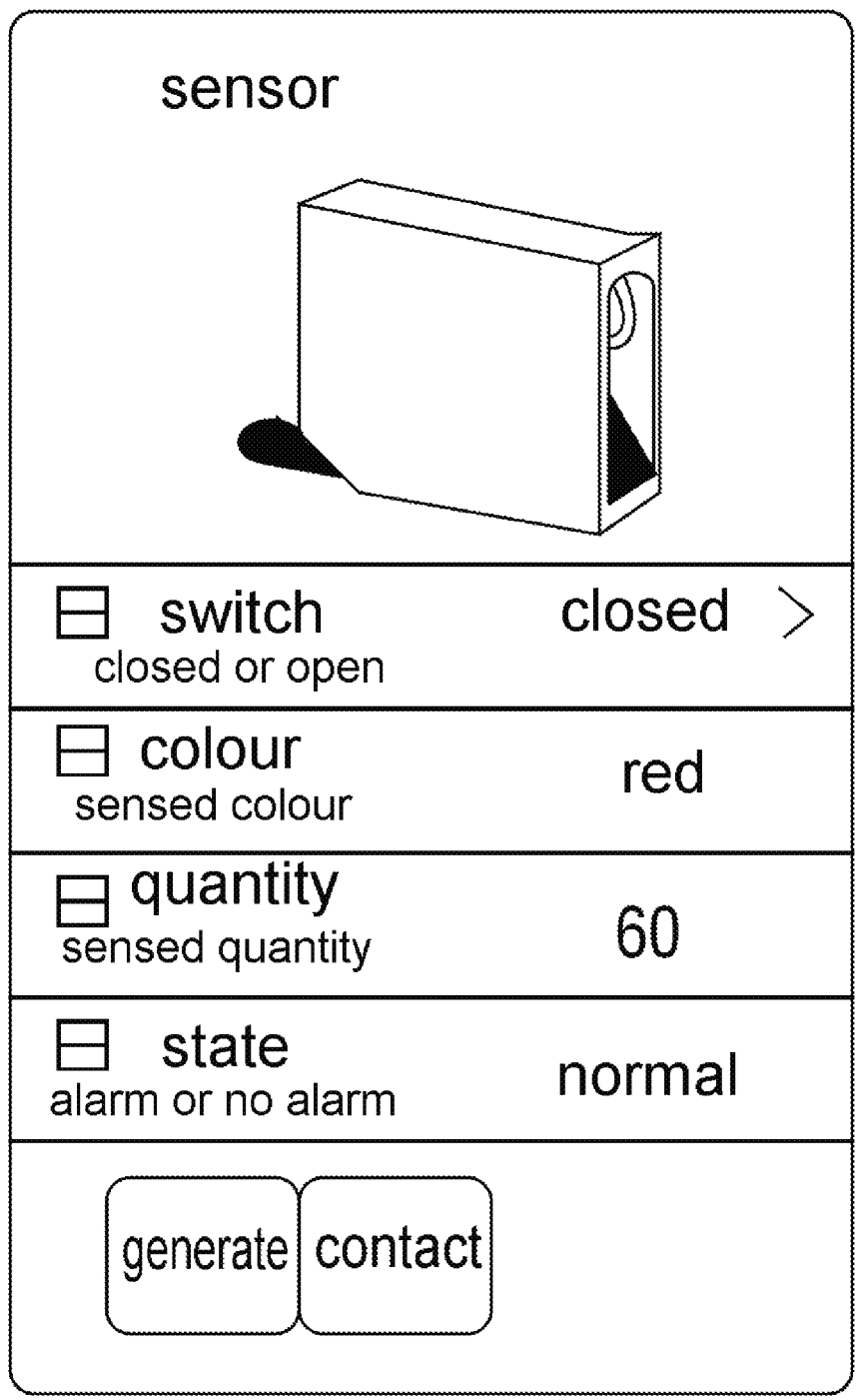
Figure 7:
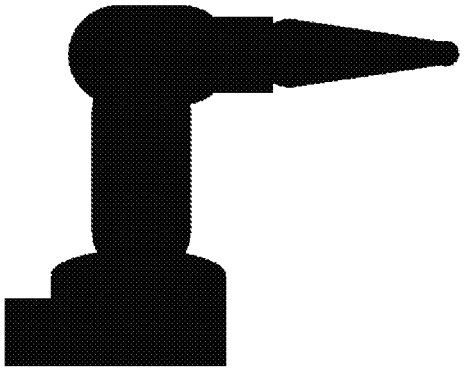

Below, the case where the system 101 is a production line is taken as an example to provide further explanation. FIGS. 5, 6 and 7 show examples of HMIs of a conveyor belt component, a sensor component and a mechanical arm component respectively.

When the user presses a "generate" button at the lower left corner of the HMI, the first operation is generated, and the electronic device 102 generates the first instruction. When the user presses a "contact" button issued by the HMI, the electronic device 102 initiates a call. The component on whose HMI the user presses the "generate" button is the first component 1011. For example: the HMI currently displayed on the screen of the electronic device 102 is the HMI of the sensor. The user presses the "generate" button on the HMI of the sensor, so the sensor, as the first component 1011, acquires the HMI resources of all the second components 1012 and generates the HMI of the system 101.

The HMI of the conveyor belt shown in FIG. 5 comprises three buttons and one state display bar of the conveyor belt. The three buttons are a "switch" button, a "direction" button and a "speed" button respectively. The "switch" button controls the connection or disconnection of a conveyor belt power supply, and the power supply is currently connected; the "direction" button controls the direction of conveying of the conveyor belt, and the direction is currently "forward"; the "speed" direction controls the speed of the conveyor belt, and the speed currently set is 5 cm/s (centimetres/second). The state display bar displays whether an alarm has arisen at present, and the state is currently normal, i.e. no alarm has arisen.

The HMI of the sensor shown in FIG. 6 comprises one button and three state display bars of the sensor. The button is a "button" switch. The three state display bars are "colour", "quantity" and "state" display bars respectively. The "switch" button controls the connection or disconnection of a sensor power supply, and the power supply is currently connected. The "colour" display bar displays a colour currently sensed by the sensor, and the colour is currently red; the "quantity" display bar displays a quantity of sensed objects currently sensed by the sensor, and the quantity of sensed objects currently sensed is 60; the "state" display bar displays whether an alarm has arisen in the sensor at present, and the state is currently normal, i.e. no alarm has arisen.

The HMI of the mechanical arm shown in FIG. 7 comprises two buttons and three state display bars of the mechanical arm. The two buttons are a "switch" button and a "gripper" button respectively. The three state display bars are "no. of axes", "load" and "precision" display bars respectively. The "switch" button controls the connection or disconnection of a mechanical arm power supply, and the power supply is currently connected; the "gripper" space controls the opening or closing of a gripper of the mechanical arm, and the gripper is currently open. The "no. of axes" display bar displays the number of mechanical arm axes, which is 4; the "load" display bar displays a maximum load of the mechanical arm, which is 6 kg (kilograms); the "precision" display bar displays the repetition precision of the mechanical arm, which is 0.05 mm (millimetres).

Optionally, the HMI of each component on the system 101 is provided by a supplier of the corresponding component; the HMI of one component comprises at least one webpage, and these webpages may be Hyper Text Markup Language 5 (HTML5) webpages, Cascading Style Sheets 3 (CSS3) webpages or JavaScript webpages. Moreover, these webpages may access an actuating mechanism and a sensor of the component.

Optionally, a web server is integrated in the first component 1011; the HMI of the first component 1011 and the automatically generated HMI of the system 10 are stored on the web server. On the electronic device 102, the HMI of the system 101 or the HMI of one component is displayed via a browser. The first instruction is an instruction requesting the automatic generation of the HMI of the system 101 on the browser.

The HMI resource is a resource relied upon when an HMI picture (e.g. webpage) is displayed, for example a library function, a webpage style or picture, etc. Optionally, in an embodiment of the present invention, HMI resources may be divided into different types, the HMI of each component contains HMI pictures suiting different screen resolutions, and each HMI picture will cite some library functions, webpage styles or images, etc., therefore the first component 1011 must acquire the HMI resource relied upon by the HMI of a second component 1012. Optionally, when acquiring an HMI resource of the second component 1012, the first component 1011 may, according to a screen resolution of the electronic device 102 displaying the first component 1011, acquire an HMI resource of the second component 1012 that is matched to the screen resolution.

Optionally, before transmitting the second instruction to the second component 1012 found in step S306, the first component 1011 may acquire a screen resolution of the electronic device 102 displaying the first component 1011. When the second instruction is transmitted, indication information for indicating the screen resolution of the electronic device 102 is carried, or information for indicating a type of HMI resource to be acquired is carried. After receiving the second instruction, the second component 1012 returns an HMI resource matched to the screen resolution to the first component 1011.

Specifically, in an embodiment of the present invention, as listed in table 1 below, HMI resources may be divided into the following types; corresponding screen resolutions are also listed in table 1.

TABLE 1

HMI resources and corresponding screen resolutions

| HMI resource | Screen resolution |
| --- | --- |
| Index HMI resource | low |
| Abbreviation HMI resource | medium |
| General HMI resource | high |

The three HMI resources listed in table 1 are explained in detail below.

One: Index HMI resource

An index HMI resource of a component comprises an icon of the component and/or a name of the component.

When the screen resolution of the electronic device 102 is low, e.g. lower than a preset first screen resolution threshold, the first component 1011 acquires the index HMI resource of the second component 1012.

Figure 8:
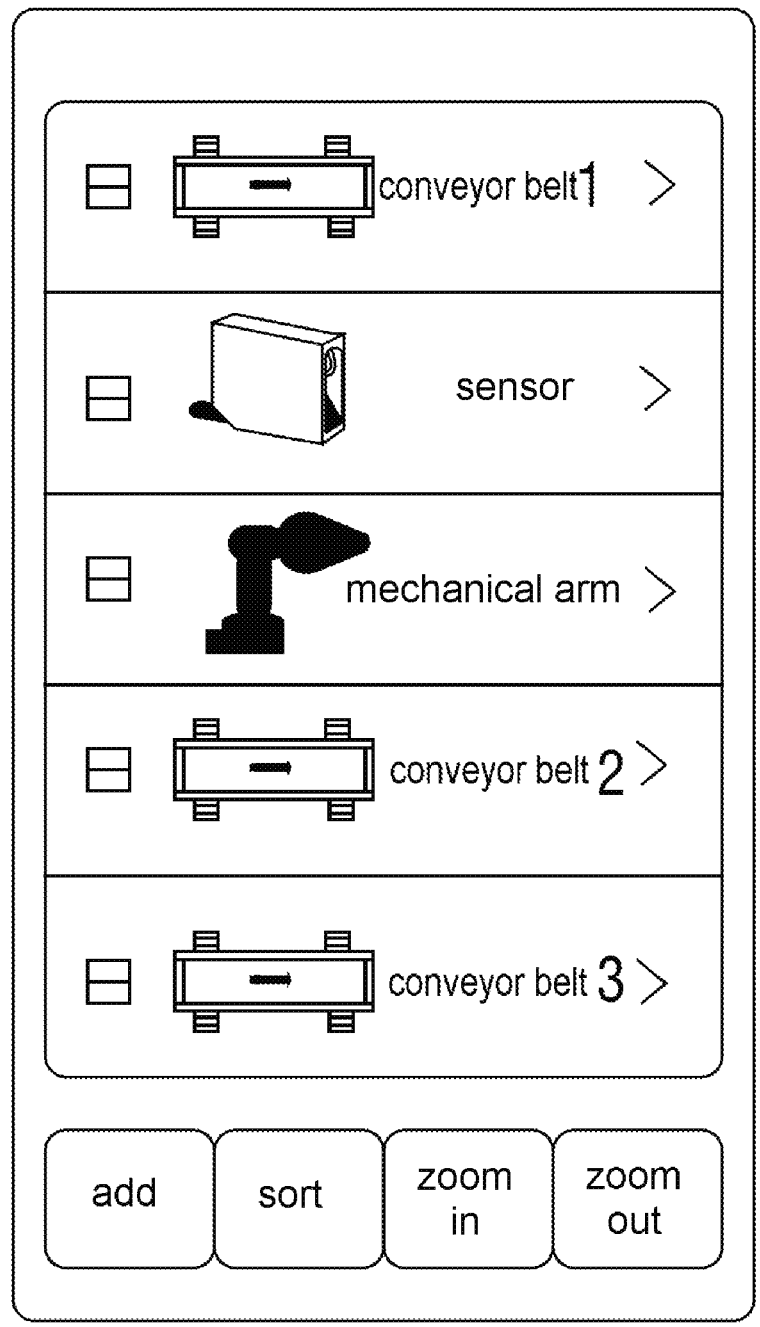
FIG. 8 shows a system HMI generated by a first component on the basis of an index HMI resource.

The HMI of the system 101 generated by the first component 1011 according to the acquired index HMI resource may be as shown in FIG. 8. In the example shown in FIG. 8, for each component, the icon of the component is at the left side, and the name of the component is at the right side. Referring to FIG. 8, a conveyor belt 1, a conveyor belt 2, a conveyor belt 3, a sensor and a mechanical arm are included on a system 101. The icons and names of these components are displayed on the HMI of the system 101. Optionally, four buttons are also included below the HMI of the system 101; these are "add", "sort", "zoom in" and "zoom out" in order from left to right. The "add" button may be used to add a component displayed on the HMI of the system 101. The "sort" button may be used to sort the HMI of the system 101 according to a preset rule, e.g. according to the frequency of use of the components. The "zoom in" button may be used to zoom in on the HMI of the system 101. The "zoom out" button may be used to zoom out of the HMI of the system 101.

Two: Abbreviation HMI resource

An abbreviation HMI resource of a component comprises an icon for identifying the component, and/or a name of the component, and further comprises preset key parameter information of the component. It is possible to preset which parameters are key parameters in a component.

When the screen resolution of the electronic device 102 is medium, e.g. not lower than the preset first screen resolution threshold and not higher than a preset second screen resolution threshold, the first component 1011 acquires the abbreviation HMI resource of the second component 1012.

Figure 9:
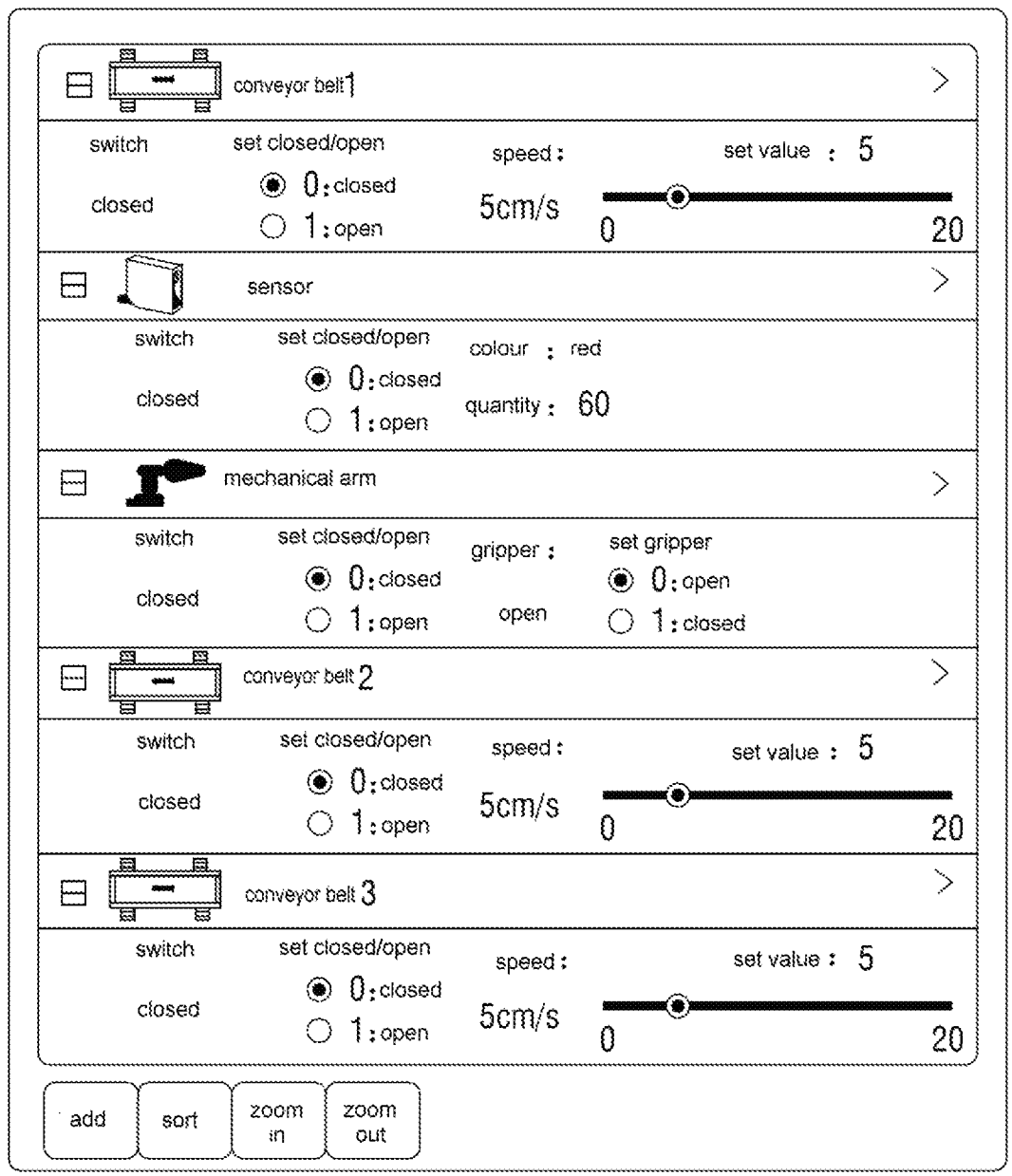
FIG. 9 shows a system HMI generated by a first component on the basis of an abbreviation HMI resource.

The HMI of the system 101 generated by the first component 1011 on the basis of the acquired abbreviation HMI resource may be as shown in FIG. 9. In the example shown in FIG. 9, for each component, an entry in an upper bar may comprise the icon of the component and the name of the component, and an entry in a lower bar may comprise key parameter information; optionally, a key parameter may also be set in the entry in the lower bar.

Three: General HMI resource

A general HMI resource of a component comprises an icon for identifying the component, and/or a name of the component, and further comprises preset detailed parameter information of the component. It is possible to preset which parameters are detailed parameters in a component, e.g. information of all parameters or information of some parameters of the component may be included.

When the screen resolution of the electronic device 102 is high, e.g. higher than a preset second screen resolution threshold, the first component 1011 acquires the general HMI resource of the second component 1012.

The second screen resolution is higher than the first screen resolution.

In the HMI of the system 101 generated by the first component 1011 on the basis of the acquired general HMI resource, for each component, an entry in an upper bar may comprise the icon of the component and the name of the component, and an entry in a lower bar may comprise detailed parameter information; optionally, a detailed parameter may also be set in the entry in the lower bar.

The HMI of the system 101 generated using the index HMI resource, shown in FIG. 8, may be displayed on a small screen, e.g. on a screen of a smart phone. The HMI of the system 101 generated using the abbreviation HMI resource, shown in FIG. 9, may be displayed on a screen of medium size, e.g. on a screen of a tablet.

In an embodiment of the present invention, if the user does not need to monitor all components, the user may click on a "hide" button at the left side of the icon of a component to hide the component. The user may also click on an arrow (>) at the right side of the name of a component to open the HMI of the component. By operating the "add" button, the user can add a hidden component again. By operating the "sort" button, the user can rearrange the positions of components according to frequency of use. Within a page, the user can zoom out of a page by operating the "zoom out" button, and can zoom in on a page by operating the "zoom in" button.

Figure 10:
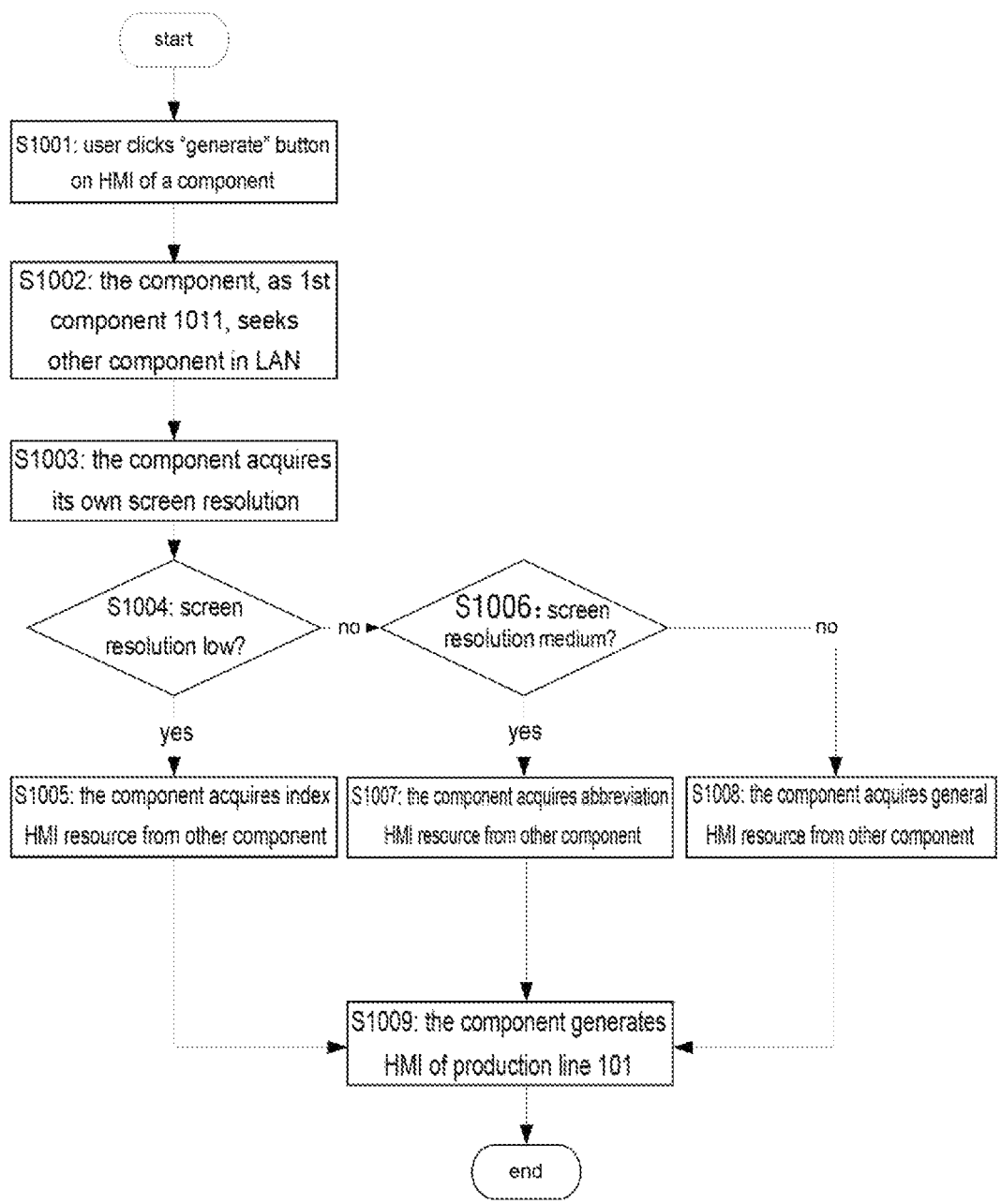
FIG. 10 shows an optional flow of system HMI generation provided in an embodiment of the present invention.

FIG. 10 shows an optional flow when generating an HMI of a system 101 in an embodiment of the present invention. As shown in FIG. 10, the flow may comprise the following steps:

S1001: a user clicks a "generate" button on an HMI of a component.

S1002: the component, as a first component 1011, seeks another component.

S1003: the component acquires a screen resolution of an electronic device displaying the component.

S1004: the component determines whether the screen resolution is low, and if so, performs step S1005, and otherwise performs step S1006.

S1005: the component acquires an index HMI resource from the other component.

S1006: the component determines whether the screen resolution is medium, and if so, performs step S1007, and otherwise performs step S1008.

S1007: the component acquires an abbreviation HMI resource from the other component.

S1008: the component acquires a general HMI resource from the other component.

S1009: the component uses the acquired HMI resource to generate the HMI of the system 101.

Figure 11:
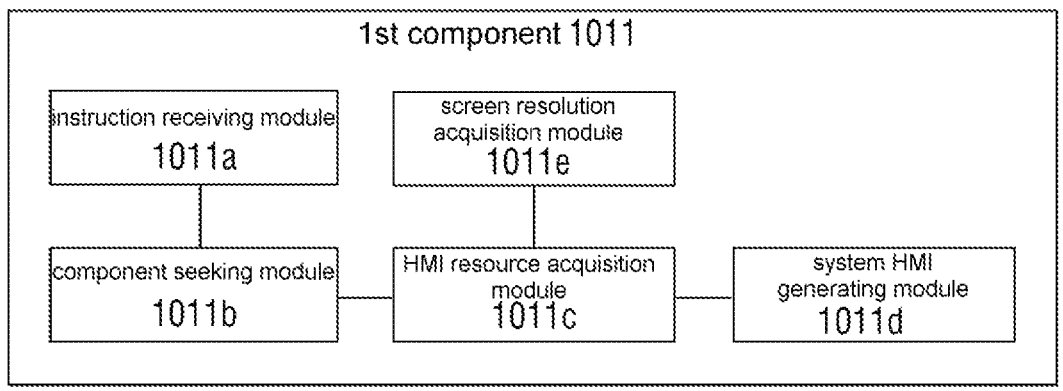
FIG. 11 shows a structural schematic diagram of a first component provided in an embodiment of the present invention.

FIG. 11 shows a structural schematic diagram of a first component 1011 provided in an embodiment of the present invention. As shown in FIG. 11, the first component 1011 may comprise:

an instruction receiving module 1011a, for receiving a first instruction via an HMI of the first component 1011, the first instruction being used to indicate that an HMI of a system 101 should be generated;

a component seeking module 1011b, for seeking each of at least one second component 1012 in the system 101;

an HMI resource acquisition module 1011c, for acquiring an HMI resource of each second component 1012 found by the component seeking module 1011b; and a system HMI generating module 1011d, for generating the HMI of the system 101 on the basis of an HMI resource of the first component 1011 and the HMI resource of each second component 1012 acquired by the HMI resource acquisition module 1011c.

Optionally, the first component 1011 further comprises a screen resolution acquisition module 1011e, for acquiring a screen resolution of an electronic device displaying the first component 1011, before the HMI resource of each second component 1012 found by the component seeking module 1011b is acquired; and the HMI resource acquisition module 1011c is specifically used for acquiring an HMI resource, matched to the screen resolution, of each second component 1012 found by the component seeking module 1011b.

Optionally, the screen resolution acquisition unit module 1011e is specifically used for:

acquiring an index HMI resource of the second component 1012 if the screen resolution is lower than a preset first screen resolution threshold, wherein an index HMI resource of a component comprises an icon of the component and/or a name of the component;

acquiring an abbreviation HMI resource of the second component 1012 if the screen resolution is not lower than the first screen resolution threshold and not higher than a preset second screen resolution threshold, wherein an abbreviation HMI resource of a component comprises an icon of the component and/or a name of the component, and further comprises preset key parameter information of the component; and acquiring a general HMI resource of the second component 1012 if the screen resolution is higher than the preset second screen resolution threshold, wherein a general HMI resource of a component comprises an icon of the component and/or a name of the component, and further comprises preset detailed parameter information of the component.

Optionally, the first component 1011 further comprises a web server 1011f; the HMI of the first component 1011 and the generated HMI of the system 101 are stored on the web server 1011f; and the first instruction is an instruction requesting the generation of the HMI of the system 101.

For another optional embodiment of the first component 1011, reference may be made to the first component 1011 in the system HMI generation flow mentioned previously; repeated parts are not described again superfluously.

Figure 12:
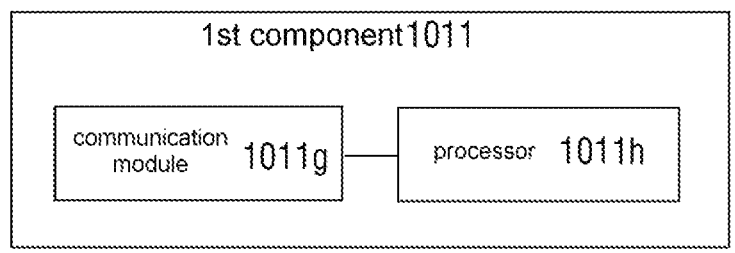
FIG. 12 shows a structural schematic diagram of another first component provided in an embodiment of the present invention.

FIG. 12 shows a structural schematic diagram of another first component 1011 provided in an embodiment of the present invention. As shown in FIG. 12, the first component 1011 comprises:

at least one communication module 1011g, for receiving a first instruction via an HMI of the first component 1011, the first instruction being used to indicate that an HMI of a system 101 should be generated;

at least one processor 1011h, for:

seeking each of at least one second component 1012 in the system 101 via the at least one communication module 1011g;

acquiring, via the at least one communication module 1011g, an HMI resource of each second component 1012 found;

generating the HMI of the system 101 on the basis of an HMI resource of the first component 1011 and the acquired HMI resource of each second component 1012.

The at least one communication module 1011g may be used to realize communication between the first component 1011 and an electronic device 102, and communication between the first component 1011 and the second component 1012. The at least one communication module 1011g should support the previously mentioned technology of communication between the first component 1011 and the electronic device 102, and the technology of communication between the first component 1011 and the second component 1012.

Optionally, the first component 1011 may further comprise at least one memory, for storing a machine instruction; the at least one processor 1011h may call the machine instruction stored in the memory, to complete an operation of the processor 1011h. In addition, the at least one memory may also store the HMI resource of the first component 1011, the HMI resource of each second component 1012 and the generated HMI resource of the system 101.

For another optional embodiment of the first component 1011, reference may be made to the implementation of the first component 1011 in the system HMI generation flow mentioned previously; repeated parts are not described again superfluously.

Figure 13:
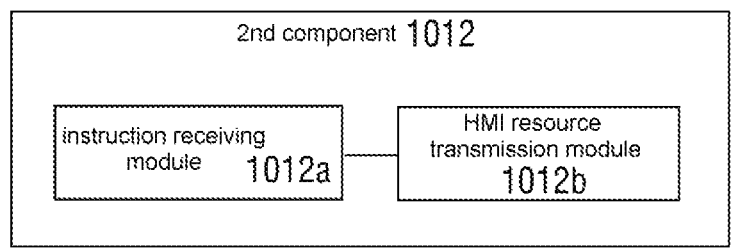
FIG. 13 shows a structural schematic diagram of a second component provided in an embodiment of the present invention.

FIG. 13 shows a structural schematic diagram of a second component 1012 provided in an embodiment of the present invention. As shown in FIG. 13, the second component 1012 comprises:

an instruction receiving module 1012a, for receiving a second instruction from a first component 1011, the second instruction being used to acquire an HMI resource of the second component 1012; and an HMI resource transmission module 1012b, for transmitting the HMI resource of the second component 1012 to the first component 1011 in response to the second instruction, the HMI resource of the second component 1012 being used for generation of an HMI of a system 101 by the first component 1011.

Optionally, the HMI resource of the second component 1012 is one of the following HMI resources:

an index HMI resource of the second component 1012, the index HMI resource comprising an icon of the second component 1012 and/or a name of the component, and being configured to be transmitted to the first component 1011 by the HMI resource transmission module 1012b when a screen resolution of an electronic device displaying the first component 1011 is lower than a preset first screen resolution threshold;

an abbreviation HMI resource of the second component 1012, the abbreviation HMI resource comprising an icon of the second component 1012 and/or a name of the component and further comprising preset key parameter information of the second component 1012, and being configured to be transmitted to the first component 1011 by the HMI resource transmission module 1012b when the screen resolution of the electronic device displaying the first component 1011 is not lower than the first screen resolution threshold and not higher than a preset second screen resolution threshold; and a general HMI resource of the second component 1012, the general HMI resource comprising an icon of the second component 1012 and/or a name of the component, and further comprising preset detailed parameter information of the second component 1012, and being configured to be transmitted to the first component 1011 by the HMI resource transmission module 1012b when the screen resolution of the electronic device displaying the first component 1011 is higher than the preset second screen resolution threshold.

For another optional embodiment of the second component 1012, reference may be made to the second component 1012 in the system HMI generation flow mentioned previously; repeated parts are not described again superfluously.

Figure 14:
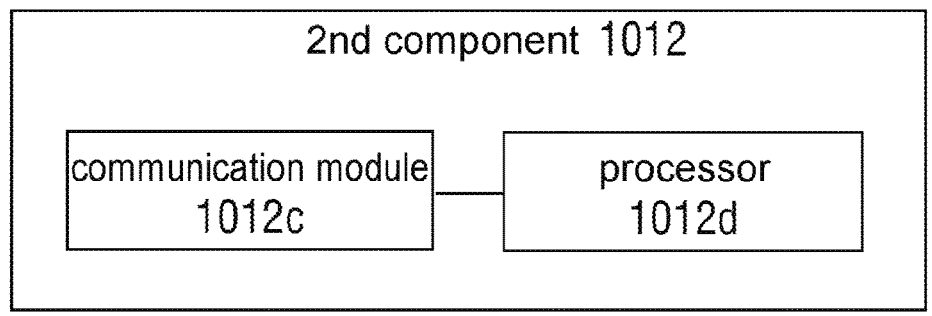
FIG. 14 shows a structural schematic diagram of another second component provided in an embodiment of the present invention.

FIG. 14 shows a structural schematic diagram of another second component 1012 provided in an embodiment of the present invention. As shown in FIG. 14, the second component 1012 may comprise:

at least one communication module 1012c, for receiving a second instruction from a first component 1011, the second instruction being used to acquire an HMI resource of the second component 1012; and at least one processor 1012d, for transmitting the HMI resource of the second component 1012 to the first component 1011 via the at least one communication module 1012c in response to the second instruction, the HMI resource of the second component 1012 being used for generation of an HMI of a system 101 by the first component 1011.

Optionally, the second component 1012 may further comprise at least one memory, for storing a machine instruction; the at least one processor 1012d may call the machine instruction stored in the memory, to complete an operation of the processor 1012d. In addition, the at least one memory may also store the HMI resource of the second component 1012.

For another optional embodiment of the second component 1012, reference may be made to the implementation of the second component 1012 in the system HMI generation flow mentioned previously; repeated parts are not described again superfluously.

The at least one communication module 1012c may be used to realize communication between the second component 1012 and the first component 1011. The at least one communication module 1012c should support the previously mentioned technology of communication between the second component 1012 and the first component 1011.

Figure 15:
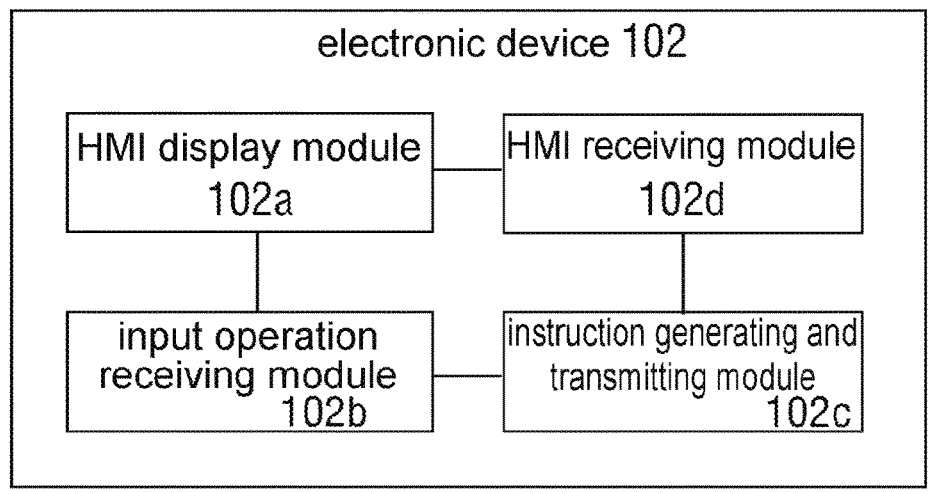
FIG. 15 shows a structural schematic diagram of an electronic device provided in an embodiment of the present invention.

FIG. 15 shows a structural schematic diagram of an electronic device 102 provided in an embodiment of the present invention. As shown in FIG. 15, the electronic device 102 may comprise:

an HMI display module 102a, for displaying an HMI of a first component 1011 on a screen of the electronic device 102;

an input operation receiving module 102b, for receiving a first operation inputted by a user on the HMI of the first component 1011 displayed on the screen, the first operation being used to indicate that an HMI of a system 101 in which the first component 1011 is located should be displayed;

an instruction generating and transmitting module 102c, for generating a first instruction and transmitting the first instruction to the first component 1011, the first instruction being used to indicate that the HMI of the system 101 should be generated;

an HMI receiving module 102d, for receiving the HMI of the system 101 from the first component 1011; and the HMI display module 102a being further used to display the HMI of the system 101 on the screen.

Optionally, a web server is integrated in the first component 1011; the HMI of the first component 1011 and the generated HMI of the system 101 are stored on the web server, and the first instruction is an instruction requesting the generation of the HMI of the system 101.

For another optional embodiment of the electronic device 102, reference may be made to the implementation of the electronic device 102 in the system HMI generation flow mentioned previously; repeated parts are not described again superfluously.

Figure 16:
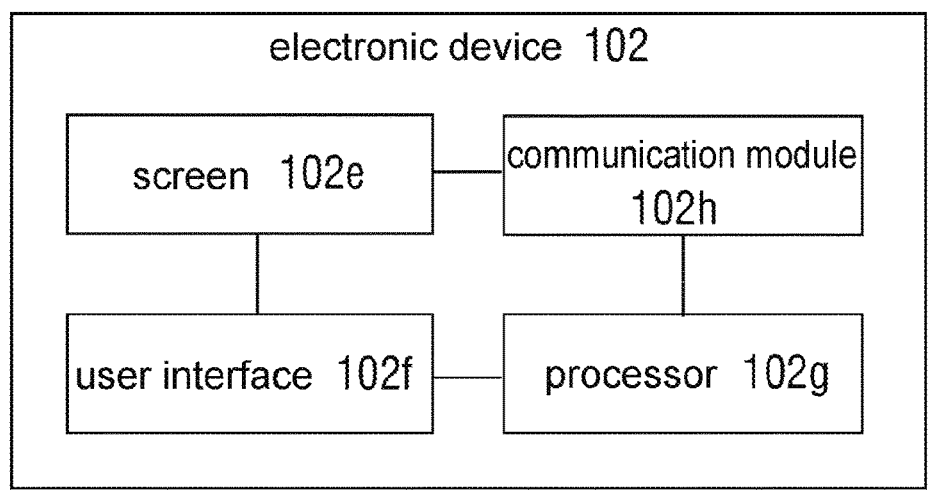
FIG. 16 shows a structural schematic diagram of another electronic device provided in an embodiment of the present invention.

FIG. 16 shows a structural schematic diagram of another electronic device 102 provided in an embodiment of the present invention. As shown in FIG. 16, the electronic device 102 may comprise:

at least one screen 102e, for displaying an HMI of a first component 1011;

at least one user interface 102f, for receiving a first operation inputted by a user on the HMI of the first component 1011, the first operation being used to indicate that an HMI of a system 101 in which the first component 1011 is located should be displayed;

at least one processor 102g, for generating a first instruction, the first instruction being used to indicate that the HMI of the system 101 should be generated;

at least one communication module 102h, for transmitting the first instruction to the first component 1011, and receiving the HMI of the system 101 from the first component 1011; and the at least one screen 102e being further used to display the HMI of the system 101.

The at least one communication module 102h may be used to realize communication between the electronic device 102 and the first component. The at least one communication module 102h should support the previously mentioned technology of communication between the first component 1011 and the electronic device 102.

Optionally, the electronic device 102 may further comprise at least one memory, for storing a machine instruction; the at least one processor 102g may call the machine instruction stored in the memory, to complete an operation of the processor 102g.

For another optional embodiment of the electronic device 102, reference may be made to the implementation of the electronic device 102 in the system HMI generation flow mentioned previously; repeated parts are not described again superfluously.

The present application also provides a machine-readable medium, storing an instruction for causing a machine to execute a checking method of an embodiment, for a machine instruction according to the present text. Specifically, a system or apparatus equipped with a storage medium may be provided; a machine instruction realizing a function of any one of the embodiments above is stored on the storage medium, and a computer (or CPU or MPU) of the system or apparatus is caused to read and execute the machine instruction stored in the storage medium.

In such a situation, the machine instruction read from the storage medium can itself realize a function of any one of the embodiments above, hence the machine instruction and the storage medium storing the machine instruction form part of the present invention.

Embodiments of storage media used for providing machine instructions include floppy disks, hard disks, magneto-optical disks, optical disks (such as CD-ROM, CD-R, CD-RW, DVD-ROM, DVD-RAM, DVD–RW, DVD+RW), magnetic tapes, non-volatile memory cards and ROM. Optionally, a machine instruction may be downloaded from a server computer via a communication network.

It must be explained that not all of the steps and modules in the flows and system structure diagrams above are necessary; certain steps or modules may be omitted according to actual requirements. The order in which the steps are executed is not fixed, but may be adjusted as required. The system structures described in the embodiments above may be physical structures, and may also be logical structures, i.e. some modules might be realized by the same physical entity, or some modules might be realized by multiple physical entities, or realized jointly by certain components in multiple independent devices.

In the embodiments above, a hardware unit may be realized in a mechanical or an electrical manner. For example, a hardware unit may comprise a permanent dedicated circuit or logic (e.g. a special processor, FPGA or ASIC) to complete a corresponding operation. A hardware unit may also comprise programmable logic or circuitry (e.g. a universal processor or another programmable processor), and may be set temporarily by software to complete a corresponding operation. Particular embodiments (mechanical, or dedicated permanent circuitry, or temporarily set circuitry) may be determined on the basis of considerations of cost and time.

The present application has been displayed and explained in detail above by way of the accompanying drawings and preferred embodiments, but the present invention is not limited to these disclosed embodiments. Based on the embodiments described above, those skilled in the art will know that further embodiments of the present invention, also falling within the scope of protection of the present invention, could be obtained by combining code checking device(s) in different embodiments above.

The invention claimed is:

1. A method for generating a human-machine interface (HMI) by a first system for generating an HMI, the first system for generating an HMI including an electronic device and a second system, the second system including a first component and at least one second component, the first component communicating with the electronic device, the method comprising:
receiving, at the first component, a first instruction via an HMI of the first component, the first instruction instructing the first component to generate an HMI of the second system;
identifying, at the first component, each of the at least one second component in the second system;
acquiring, at the first component, a screen resolution of the electronic device displaying the HMI of the first component;
acquiring, at the first component, an HMI resource of each of the at least one second component, based on the screen resolution; and
generating, at the first component, the HMI of the second system based upon an HMI resource of the first component and the HMI resource of each of the at least one second component, wherein the HMI resource of each of the at least one second component is based on the screen resolution.

2. The method of claim 1, wherein the acquiring the HMI resource comprises:
acquiring, at the first component, an index HMI resource of each of the at least one second component in response to the screen resolution being lower than a first screen resolution threshold, wherein the index HMI resource includes at least one of an icon of the respective second component or a name of the respective second component;
acquiring, at the first component, an abbreviation HMI resource of each of the at least one second component in response to the screen resolution not being lower than the first screen resolution threshold and not being higher than a second screen resolution threshold, wherein the abbreviation HMI resource includes at least one of the icon of the respective second component or the name of the respective second component, and further includes key parameter information of the respective second component; and
acquiring, at the first component, a general HMI resource of each of the at least one second component in response to the screen resolution being higher than the second screen resolution threshold, wherein the general HMI resource includes at least one of the icon of the respective second component or the name of the respective second component, and further includes detailed parameter information of the respective second component.

3. The method of claim 1, wherein
a web server is integrated in the first component, and
the HMI of the first component and the HMI of the second system are stored on the web server.

4. A non-transitory machine-readable medium, storing a machine instruction, the machine instruction, when executed by a processor, causing the processor to execute the method of claim 1.

5. The method of claim 1, wherein the HMI of the second system does not include the electronic device.

6. The method of claim 1, wherein the electronic device is not included in the second system.

7. The method of claim 1, wherein the electronic device is separate from the first component.

8. A system for generating a human-machine interface (HMI), the system comprising:
an electronic device including at least one first processor; and
a second system including,
a first component including at least one second processor, and
at least one second component, wherein
the at least one first processor is configured to cause the electronic device to,
display an HMI of the first component on a display of the electronic device,
receive a first operation to display an HMI of the second system,
generate a first instruction to generate the HMI of the second system, and
transmit the first instruction to the first component, and
the at least one second processor is configured to cause the first component to,
receive the first instruction from the electronic device via the HMI of the first component,
identify each of the at least one second component in the second system,
acquire a screen resolution of the electronic device,
transmit a second instruction to each of the at least one second component, the second instruction based on the screen resolution, and
acquire an HMI resource of each of the at least one second component, based on the second instruction,
wherein each of the at least one second component is configured to transmit the HMI resource of the respective at least one second component to the first component in response to the second instruction,
wherein the at least one second processor is configured to cause the first component to,
generate the HMI of the second system, based upon an HMI resource of the first component and the HMI resource of each of the at least one second component, wherein the HMI resource of each of the at least one second component is based on the screen resolution, and transmit the HMI of the second system to the electronic device, and wherein the at least one first processor is configured to cause the electronic device to, receive the HMI of the second system from the first component, and display the HMI of the second system on the display.

9. A first component of a system including at least one second component, the first component comprising:

at least one processor configured to cause the first component to, receive a first instruction from an electronic device via an HMI of the first component, the first instruction instructing the first component to generate an HMI of the system, and the electronic device displaying the HMI of the first component, identify each of the at least one second component, acquire a screen resolution of the electronic device, acquire an HMI resource of each of the at least one second component, based on the screen resolution, and generate the HMI of the system based upon an HMI resource of the first component and the HMI resource of each of the at least one second component, wherein the HMI resource of each of the at least one second component is based on the screen resolution.

10. The first component of claim 9, wherein
a web server is integrated in the first component, and
the HMI of the first component and the HMI of the system are stored on the web server.

11. The first component of claim 9, wherein the at least one processor is configured to cause the first component to:

acquire an index HMI resource of each of the at least one second component in response to the screen resolution being lower than a first screen resolution threshold, wherein the index HMI resource includes at least one of an icon of the respective second component or a name of the respective component;

acquire an abbreviation HMI resource of each of the at least one second component in response to the screen resolution not being lower than the first screen resolution threshold, and not being higher than a second screen resolution threshold, wherein the abbreviation HMI resource includes at least one of the icon of the respective second component or the name of the respective second component, and further includes key parameter information of the respective second component; and acquire a general HMI resource of each of the at least one second component in response to the screen resolution being higher than the second screen resolution threshold, wherein the general HMI resource includes at least one of the icon of the respective second component or the name of the respective second component, and further includes detailed parameter information of the respective second component.

* * * * *